United States Patent [19]

Cassella et al.

[11] 4,256,577
[45] * Mar. 17, 1981

[54] TWO STEP REMOVAL OF METAL IONS FROM EFFLUENTS

[75] Inventors: Vincent J. Cassella, Crystal Lake, Ill.; Mazin R. Irani, King of Prussia, Pa.

[73] Assignee: PQ Corporation, Valley Forge, Pa.

[ * ] Notice: The portion of the term of this patent subsequent to Apr. 29, 1997, has been disclaimed.

[21] Appl. No.: 49,703

[22] Filed: Jun. 18, 1979

[51] Int. Cl.$^3$ .............................................. C02F 1/52
[52] U.S. Cl. ..................................... 210/738; 210/702; 210/913
[58] Field of Search ............... 210/38 B, 49, 50–53, 210/DIG. 30, 45, 47, 59, 60; 252/457

[56] References Cited

U.S. PATENT DOCUMENTS

| | | | |
|---|---|---|---|
| 3,575,854 | 4/1971 | Richards | 210/50 |
| 3,755,183 | 8/1973 | Fahn et al. | 252/457 |
| 3,766,036 | 10/1973 | McKaveney | 210/DIG. 30 |
| 3,928,195 | 12/1975 | Hoeltgen et al. | 210/49 |
| 4,012,320 | 3/1977 | Conner et al. | 210/45 |

FOREIGN PATENT DOCUMENTS

| | | | |
|---|---|---|---|
| 46-23491 | 7/1971 | Japan | 210/DIG. 30 |
| 49-16605 | 2/1974 | Japan | 210/38 B |
| 50-655 | 1/1975 | Japan | 210/51 |
| 50-8265 | 4/1975 | Japan | 210/DIG. 30 |
| 52-10097 | 3/1977 | Japan | 210/DIG. 30 |

*Primary Examiner*—Benoit Castel
*Attorney, Agent, or Firm*—Ernest G. Posner; J. S. Steven Bobb; Fred C. Philpitt

[57] ABSTRACT

Almost complete elimination of metal ions in aqueous effluents can be effected by treating said effluent with a base and then adding amorphous, hydrated magnesium silicate. This sequential process allows metal ion concentration to be reduced to less than 0.1 part per million while using a fairly small amount of amorphous hydrated magnesium silicate.

3 Claims, No Drawings

TWO STEP REMOVAL OF METAL IONS FROM EFFLUENTS

This application is related to our co-pending patent application Ser. No. 968,938, filed on Dec. 13, 1978 now U.S. Pat. No. 4,200,528, which in turn was a continuation-in-part of our patent application Ser. No. 891,232 filed on Mar. 29, 1978, now abandoned.

BACKGROUND OF THE INVENTION

This invention relates to the treatment of largely contaminated aqueous effluents. In particular, it provides a two step method for removing virtually all of the metal ions from aqueous effluents prior to release to the environment.

The aqueous effluents of many industries contain metal ions. In the past, these wastes have been discharged to the environment with the attendant harmful effects. Recently, these harmful effects such as metal poisoning, have been recognized and strict limits on the metals discharged in aqueous effluents have been established by various regulatory agencies. It is known that many metal ions are stable in acid conditions and that when such acid solutions are neutralized, these metals will precipitate. However, such methods allow a significant amount of the metal ion to remain in solution, 10 ppm or more. A secondary treatment with perhaps an ion exchange resin is necessary to further reduce the metal ion in solution but these materials are expensive and require large amounts of water, chemicals and energy for regeneration.

In preparing this application, the arts dealing with waste water treatment and adsorption by magnesium silicate were reviewed and the most relevant reference appears to be our prior patent application Ser. No. 968,938, now U.S. Pat. No. 4,200,528. This application teaches that amorphous, hydrated magnesium silicate complexes metal ion, thereby effectively removing them from aqueous effluents. Large amounts of the silicate are required to achieve low levels of residual metal ion. About 5% silicate based on the weight of the effluent is required to reduce the metal ion concentration below about 1 ppm.

It is an object of this invention to exploit the synergism that occurs when treatment of an effluent with a base is followed by addition of a minimal amount of magnesium silicate to reduce the metal ion concentration to less than 0.1 ppm.

SUMMARY OF THE INVENTION

Effluent streams that contain up to 1500 ppm metal ions are effectively treated to remove said metals by sequential addition of a base and then hydrated magensium silicate. This combination acts in a synergistic manner to afford more complete complexing and removal of the metal ions than either component used alone. The base, an alkali metal hydroxide or its equivalent is used to neutralize the solution or provide a slightly alkaline environment. Then a minimal amount of hydrated magnesium silicate is added to complex the metal ion. The complexed material is easily filtered thereby removing the metals from the effluent.

THE INVENTION

An amorphous highly hydrated, porous magnesium silicate is required for the process of our invention. Such materials can be prepared by the interaction of soluble magnesium salts and alkali metal silicate or by the interaction of magnesium hydroxide, an acid and alkali metal silicate. Other methods of preparation may also lead to useful materials provided the products have the required composition and properties, which are summarized in Table I.

TABLE I

| | |
|---|---|
| Mole Ratio (SiO$_2$/MgO) | 1.75 to 4.50 |
| Average Particle Size (microns) | 10 to 55 |
| Surface Area (m$^2$/g) | >30 |
| Bulk Density, Tamped (g/cc) | 0.40 to 0.75 |
| Weight Loss at 105° C. (wt. %) | 5 to 15 |
| Ignition Loss (wt. %) | 10 to 30 |

We prefer the magnesium silicate to have a surface area between 35 and 65 m$^2$/g. The useful silicate is white, free-flowing, insoluble in water, and easily filtered from or settles in aqueous suspensions. The proper balance of particle size surface area and bulk density indicated in Table I are important to provide absorptivity and filterability. Crystalline magnesium silicates and amorphous materials with low water content do not seem to interact with the aqueous medium to provide complexing of the metal ions.

The base required for our process should be inorganic such as alkali metal hydroxides. Ammonia and organic bases such as amines, supply OH ions but in many cases form stable soluble complexes with metal ions and as such, are not universally useful for our purpose. These bases such as lithium, sodium and potassium hydroxides are used as solutions, the concentration of which is not critical. Generally, we use solution equivalent to about 0.25 to 5.0 N.

Our system is effective in reducing rather high levels of most metal ions to less than 0.1 ppm. Examples of such metals include the divalent ions of cadmium, lead, copper, cobalt, iron and nickel, and the trivalent ions of chromium and iron.

The process of our invention is carried out as follows:
 (a) agitating an aqueous effluent that contains metal ions;
 (b) adding sufficient 0.2 to 5.0 N NaOH solution or its equivalent to adjust the pH to about 7.0 to 9.0; thereby forming a metal oxide precipitate;
 (c) adding hydrated magnesium silicate in an amount sufficient to reduce the metal ion content below about 0.1 ppm, about 0.3 to 1.3% of the silicate produces the desired result;
 (d) continuing the agitation for a period sufficient for a metal-magnesium silicate complex to form, about 5 to 30 minutes is required; and
 (e) separating the metal oxide precipitate and the metal-magnesium silicate complex from the effluent by settling, filtering or centrifuging.

This process allows the effective removal of very large or relatively smaller concentration of metal ions while using a limited amount of the magnesium silicate.

EXAMPLES

The following Examples illustrate certain embodiments of our invention and should not be considered as limiting to the scope of the invention. The limitations and scope of our invention are fully described and defined in the specification and claims. All proportions are in parts by weight (pbw), weight percent (%) or parts per million on a weight basis (ppm), unless otherwise stated.

EXAMPLE 1

This Example illustrates the removal of metal ions from solution by the process of our invention. A solution was prepared that contained 803 ppm of trivalent iron. This solution was agitated and 1.0 N NaOH was added slowly until the pH was 7.0. Then 0.8% of hydrated magnesium silicate was added. Agitation continued for 30 minutes after addition. Then the mixture was filtered and the filtrate analyzed and found to contain less than 1 ppm of $Fe^{+3}$. The magnesium silicate had a mole ratio of $SiO_2/MgO$ of 2.5, an average particle size of 30 microns, a surface area of 50 $m^2/g$, and a bulk density of 0.56 g/cc, a weight loss at 105° C. of 12% and an ignition loss of 23%.

EXAMPLE 2

This example shows that relatively small dosages of hydrated magnesium silicate can reduce the concentration of a metal ion to less than 1 ppm and that further, additions of magnesium silicate do not result in further significant reductions of concentration. A solution was prepared containing 910 ppm of divalent cadmium. This solution was agitated while the pH was adjusted to 9.0 using 1.5 N NaOH. Then 1, 2 and 5% of the magnesium silicate described in Example 1 was added. Mixing was continued for 30 minutes. The resulting mixtures were filtered and the filtrates analyzed for $Cd^{+2}$. At 1%, magnesium silicate 0.077 ppm of $Cd^{+2}$ remained in solution. At 2 and 5% addition of magnesium silicate 0.013 ppm of $Cd^{+2}$ remained in solution. Using 2% and 5% of the magnesium silicate does not really reduce the $Cd^{+2}$ concentration significantly when compared with 1%.

EXAMPLE 3

The process described in Example 2 was repeated except that 1.5 N NaOH was used for the pH adjustment to 9.0 and the mixing time after addition of the magnesium silicate was 10 minutes. The results were:

1% magnesium silicate: 0.082 ppm
2% magnesium silicate: 0.024 ppm
5% magnesium silicate: 0.024 ppm

EXAMPLE 4

This Example illustrates the synergistic effect of using first the pH adjustment and then the addition of magnesium silicate to complex the remaining metal ion with various concentrations of divalent copper and cadmium and trivalent iron and chromium. These solutions were adjusted in pH with 1.0 N NaOH and then treated with 1% of the magnesium silicate described in Example 1. The solutions were also treated with separate additions of 1 N NaOH or 5% of the magnesium silicate as comparisons. The results are summarized in Table II: Column I shows the metal ion concentration after simply adjusting the pH of the effluent with 1 N NaOH. Column II shows the metal ion concentration after addition of magnesium silicate with no pH adjustment. Column III shows the metal ion concentration after pH adjustment to the pH value shown in Column I followed by addition of 1% magnesium silicate.

TABLE II

| Metal Ion Orig. Conc. (ppm) | Column I NaOH Addition | | Column II Addition of 5% Magnesium Silicate Metal Ion Conc. ppm | Column III NaOH Addition + 1% Magnesium Silicate Metal Ion Concentration, ppm |
|---|---|---|---|---|
| | pH | Metal Ion Conc. ppm | | |
| $Fe^{+3}$ (980) | 7.0 | 8.4 | 0.3 | 0.1 |
| $Cd^{+2}$ (910) | 9.0 | 13.0 | 1.4 | 0.0 |
| $Cr^{+3}$ (1300) | 7.0 | 31.0 | 0.4 | 0.01 |
| $Cu^{+2}$ (900) | 8.0 | 26.0 | 0.1 | 0.1 |

These results show that treatment of effluents with a base followed by addition of magnesium silicate is very effective in reducing the metal ion concentration to very low levels. The results further show that the combination treatment is more efficient then either component of the treatment even though simple addition of the magnesium silicate was carried out at 5 times the dosage of the combination.

We claim:

1. A process for reducing the metal ion concentration of aqueous effluents to less than 0.1 part per million (ppm) consisting of the sequential steps of:
   a. Agitating an aqueous effluent containing up to 1500 ppm of a metal ion selected from the group consisting of divalent manganese, copper, cadmium, lead, iron, cobalt, nickel and zinc and trivalent chromium and iron;
   b. Adding an aqueous solution of an inorganic base to adjust the pH of the effluent to a value between 7.0 and 9.0;
   c. Adding 0.3 to 1.3% by weight of hydrated amorphous magnesium silicate to the neutral or slightly basic effluent, thereby forming an insoluble metal-magnesium silicate complex;
   said hydrated amorphous magnesium silicate being characterized by:
   Mole Ratio ($SiO_2/MgO$): 1.75 to 4.0
   Average Particle Size (microns): 10 to 55
   Surface Area ($m^2/g$): 35 to 65
   Bulk Density Tamped (g/cc): 0.40 to 0.75
   Weight Loss at 105° C. (wt. %): 5 to 15
   Ignition Loss (wt. %): 10 to 30
   d. Continuing the agitation for a period sufficient for said metal-magnesium complex to form; and
   e. Separating the insoluble material from the aqueous effluent which now contains less than 0.1% of the metal ions.

2. The process of either of claim 1 wherein the inorganic base is an alkali metal hydroxide in a 0.25 to 5.0 N solution.

3. The process of claim 2 wherein the hydroxide is sodium, potassium or lithium hydroxide.

* * * * *